(No Model.)

C. V. ROTE.
Car Brake.

No. 234,493.            Patented Nov. 16, 1880.

WITNESSES.            INVENTOR.

W. B. Miley            Charles V. Rote.
Jacob Stauffer

UNITED STATES PATENT OFFICE.

CHARLES V. ROTE, OF LANCASTER, PENNSYLVANIA.

CAR-BRAKE.

SPECIFICATION forming part of Letters Patent No. 234,493, dated November 16, 1880.

Application filed March 19, 1880. (No model.)

*To all whom it may concern:*

Be it known that I, CHARLES V. ROTE, of the city and county of Lancaster, in the State of Pennsylvania, have invented certain Improvements in Automatic Car-Brakes, of which the following is a specification.

The object of this invention is to actuate the ordinary brakes on railroad-cars automatically by devices, in combination with the ordinary bumper, as herein more fully set forth.

The accompanying drawings, with the letters of reference marked thereon, and a brief description, will enable those skilled in the art to make and use the same.

Figure 1:
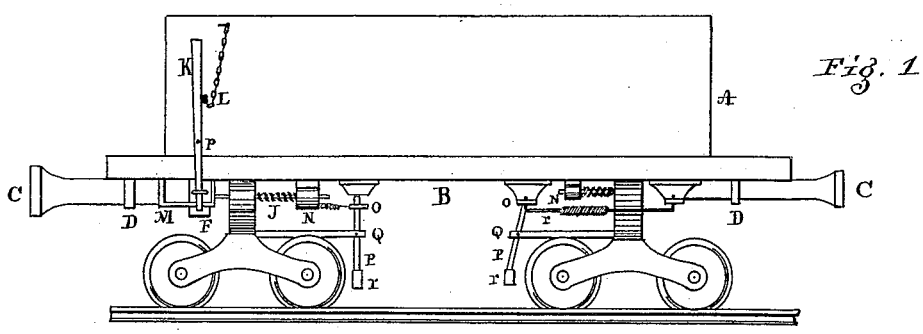
Figure 2:
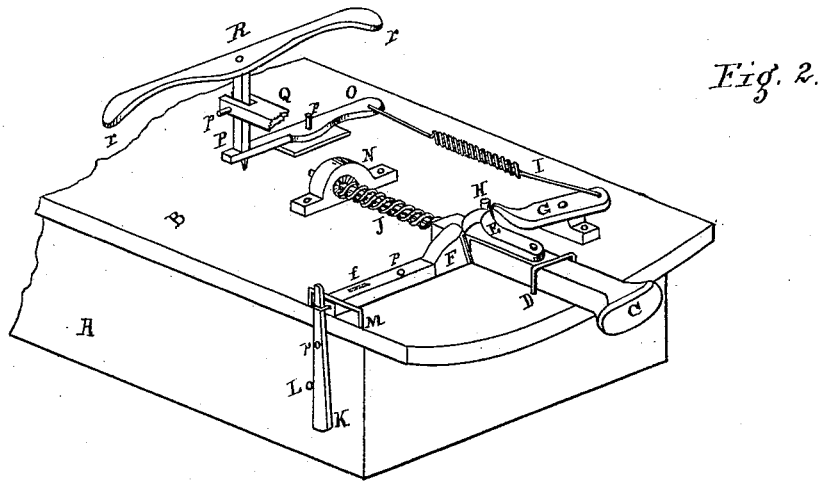

Figure 1 represents an ordinary box-car on two trucks, with the brakes and bumpers in place. In Fig. 2 I show the under side of one end of the car, that is turned upside down, with the truck-wheels and timbers removed in order to illustrate the combination of the new with the old or ordinary brake and bumper.

There is no novelty in the bumper C, keeper D, projecting rod, and spring J, with its bearings.

The actuating device consists in the application of a headed block, E, to the under side of the extension of the bumper inside the keeper D, the end of which is held by a pivot, upon which the head-block (which is rounded in front) may be turned to one side.

To prevent the block E from turning aside a headed side block, F, is provided, which holds it in place. This holder is made to turn on a pivot, as shown. A loop in the end ƒ holds the end of a vertical lever, K, mounted on a pivot and held in place by a pin, L, inserted on one side of the said lever. This end ƒ has its motion confined by a keeper, M. This headed stay-block F ƒ is not connected with the buffer or bumper C. On the opposite side of the bumper there is also a vibrating lever, G, on a central pivot-pin, the inner end of which is raised so as to come in contact with the head of the block E. There is also a fixed pin, H, inserted in the bumper, to prevent the lever turning in that direction unless carried back with the bumper as it yields on its spring-rod when pushed back by coming in contact with the bumper of another car, in which case the bumper carries the headed block and pin H with it, and thus actuating the vibrating lever G, which has its other end connected by a stout coiled spring, I, with the ordinary car-brake and lever O, worked by hand usually.

By this device it will be seen that in the event of a sudden check to the train by the breaking of a coupling or otherwise, the concussion will actuate all the brakes simultaneously with the impact, and thus act automatically on the moment of contact with great certainty and saving of rolling-stock; and the improvement is deemed both cheap, simple, and highly important.

To prevent the action of this device when backing the cars or shifting them it is only necessary to draw the pin L, push the end of the lever K over, and then insert the pin into the same hole, which now comes on the opposite side of the lever and holds the headed block F out of the way of the bumper-block E, so that it can turn aside and not act upon the end of the vibrating lever G, which operates the brakes, thus leaving the bumper free, as in ordinary cases without such an attachment.

The pin L may have an eye for a chain to prevent loss or misplacement.

I do not deem it necessary to describe the action of the lever O, vertical arm P, and central slotted pivot-support Q, and cross brake-bar R, and rubbers r. In this arrangement I adopt the ordinary combination, and claim no novelty when used as a hand-brake.

Having thus fully described my invention, I do not wish to be understood as claiming, broadly, devices for automatically actuating the ordinary brakes on railroad-cars through the medium of the ordinary sliding bumpers; but

I claim as my invention—

The combination of the sliding bumper having the block E and pin H, the pivoted side arm, F, shifting devices K L, and vibrating side lever, G, and rod I, for connecting the lever G with the brake-lever O, the several parts constructed and relatively arranged to operate substantially in the manner herein shown and described.

CHARLES V. ROTE.

Witnesses:
  W. B. WILEY,
  JACOB STAUFFER.